United States Patent [19]
McLain

[11] 3,947,161
[45] Mar. 30, 1976

[54] COMPOSITE METAL SEALS FOR USE IN ROTARY INTERNAL ENGINES

[75] Inventor: Charles D. McLain, Alton, Ill.

[73] Assignee: Olin Corporation, New Haven, Conn.

[22] Filed: July 22, 1974

[21] Appl. No.: 490,779

Related U.S. Application Data

[63] Continuation-in-part of Ser. No. 347,153, April 2, 1973, abandoned.

[52] U.S. Cl. ............... 418/113; 418/178; 418/179; 277/235 R
[51] Int. Cl.² F01C 19/04; F01C 21/00; F04C 27/00; F16J 15/00
[58] Field of Search ............ 418/113, 119–124, 418/178, 179; 277/81 P, 235 R, 236

[56] References Cited
UNITED STATES PATENTS

| | | | |
|---|---|---|---|
| 3,245,387 | 4/1966 | Froede | 418/122 |
| 3,263,912 | 8/1966 | Frenzel | 418/122 |
| 3,300,124 | 1/1967 | Jones | 418/122 |
| 3,381,364 | 5/1968 | Winter | 29/488 |

FOREIGN PATENTS OR APPLICATIONS

| | | | |
|---|---|---|---|
| 1,223,613 | 8/1966 | Germany | 418/178 |
| 1,218,822 | 6/1966 | Germany | 418/113 |

Primary Examiner—John J. Vrablik
Attorney, Agent, or Firm—Robert H. Bachman; David A. Jackson

[57] ABSTRACT

A composite metal rotor tip seal for use in rotary internal combustion engines and a process for making a composite rotor tip seal. The composite seals are formed from at least two different metals or alloys having different frictional and wear characteristics whereby uniform wear and improved sealing are obtained. The seal is mounted so that different components of the composite contact the chamber wall during operation. A process for producing composite material, for the fabrication of composite seals, utilizing a pressure welding process is also described.

10 Claims, 11 Drawing Figures

COMPOSITE METAL SEALS FOR USE IN ROTARY INTERNAL ENGINES

CROSS REFERENCE TO RELATED APPLICATION

This case is a continuation-in-part of copending application Ser. No. 347,153 by Charles D. McLain for "Composite Metal Seals For Use In Rotary Internal Combustion Engines", filed Apr. 2, 1973 and now abandoned.

BACKGROUND OF THE INVENTION

The rotary internal combustion or Wankel engine is being considered for use as a replacement for conventional reciprocating piston type internal combustion engines in automotive and similar applications.

The advantages of the rotary internal combustion engine include simplicity and light weight and small size per horsepower output. Basically the engine consists of a triangular shaped rotor which rotates eccentrically within an epitrochoidal chamber. Seals at the tips of the rotor serve to divide the space within the chamber into three working spaces. As the rotor rotates these working spaces also rotate and their volume changes as a function of rotation. This change in volume is used to compress the fuel air mixture which is subsequently burned and exhausted. The expansion of the burning fuel air mixture provides the energy which is developed into power output.

A significant difficulty encountered in the development and use of the rotary internal combustion engine is the difficulty encountered with the rotor tip seals. During operation of the engine these seals contact the chamber wall and have a high velocity relative to the chamber wall. The resulting friction causes the seal and/or the chamber wall to wear rapidly. Difficulty has also been encountered because of the deleterious effect of thermal and mechanical shock encountered during operation on the seals.

For economic reasons conventional practice has been to make the cavity walls significantly harder than the rotor tip seals. In this way the wear problem is largely confined to the rotor tip seals. If the rotary internal combustion engine is to be a commercial success, the seals and the cavity wall must last for the life of the engine.

SUMMARY OF THE INVENTION

The improved rotor tip seal disclosed in the present application consists of at least two different metal layers metallurgically bonded together and mounted so that different metal components are in contact with the chamber wall during various stages of the combustion cycle.

It is an object of this invention to provide a rotor tip seal having a combination of superior wear resistance and sealing properties.

A further object of this invention is to provide a rotor tip seal which tends to wear evenly during its useful life.

Yet another object of this invention is to provide a process for making rotor tip seals having superior resistance to abrasion and wear.

Still a further object of this invention is to provide a composite seal wherein the seal components have different wear rates with the leading edge having a greater resistance to wear than the trailing edge.

Further objects and advantages of the present invention will become evident as reference is made to the detailed description of the invention.

In accordance with the present invention is has been found that these objects may be readily achieved.

DESCRIPTION OF THE INVENTION

Figure 1:
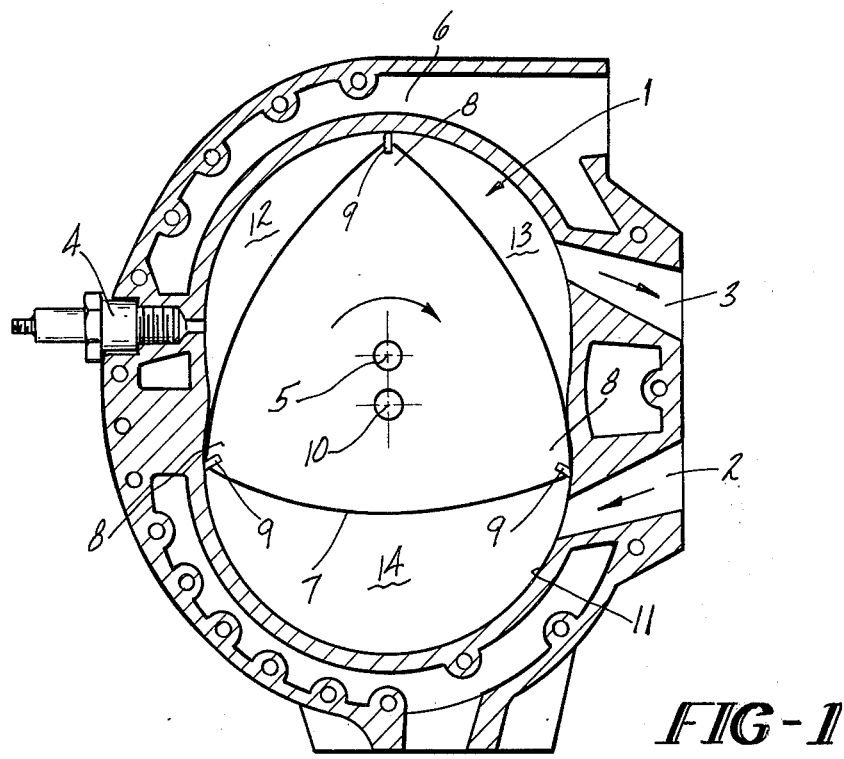
FIG. 1 shows a cross-sectional view of a rotary internal combustion engine.

A cross-sectional view of a rotary combustion engine is shown in FIG. 1. The engine comprises an epitrochoidal chamber 1 having an intake port 2 and an exhaust port 3 passing through the chamber wall 11 for the flow of gases during operation of the engine and an ignition means 4 for igniting the air fuel mixture. The epitrochoidal chamber is cooled by water which flows through a water passage 6 within the wall 11 of the chamber. Within the epitrochoidal chamber is a rotor 7 having three apexes 8. At each apex 8 there is a seal 9 which contacts the inner wall 11 of the chamber. These apex seals serve to divide the space between the rotor and the chamber wall into three working spaces 12, 13 and 14. As the rotor rotates the working spaces 12, 13 and 14 rotate and the different cycles of the combustion process occur. For example, when the rotor is in the position shown in FIG. 1, combustion is occurring in space 12, the exhaust process is occurring in space 13 and the intake process is occurring in space 14. The rotor rotates about an axis 5 which in turn rotates about the center 10 of the epitrochoidal chamber 1.

As previously indicated, one of the major drawbacks heretofore encountered in the development of the rotary internal combustion engine has been the high wear rates which have been encountered in the rotor tip seals. This high rate is compounded by the fact that the angle of contact between the rotor tip seals and the chamber wall varies as the rotor rotates.

Figures 2A, 2B:
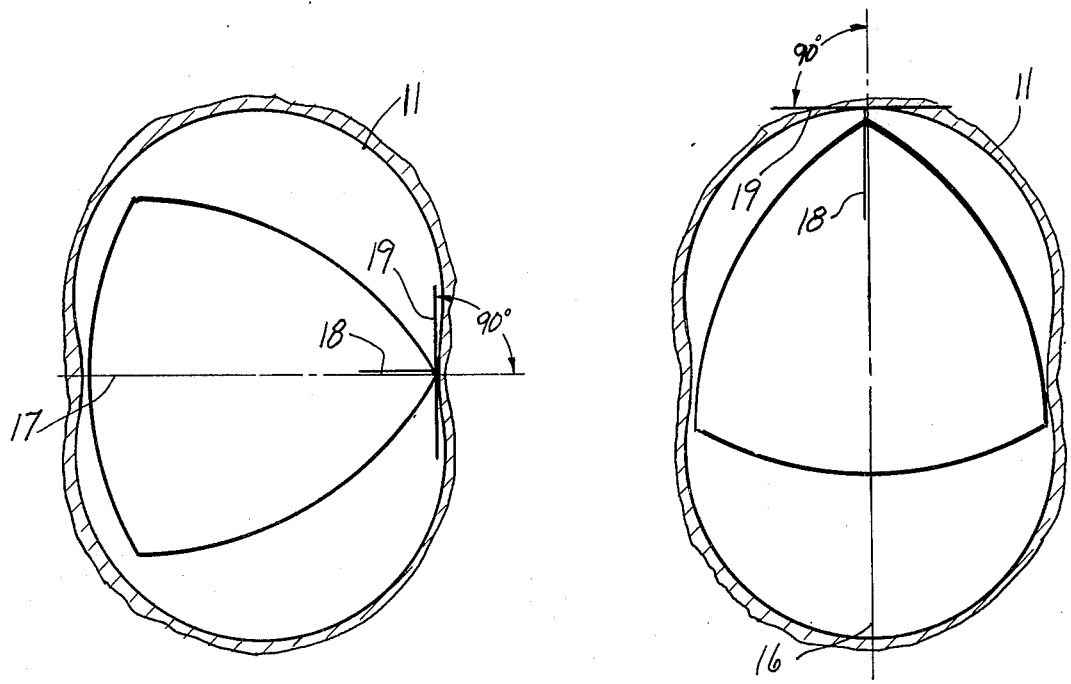
FIGS. 2A and 2B show the geometric relationship between the rotor tip and the chamber wall when the rotor tip is at the minor and major axis respectively.

The angle between the rotor tip seal and the normal axis to the chamber wall at the point of contact is known as the tilt angle. FIGS. 2A and 2B show the tilt angle at the major and minor axis. At both major 16 and minor 17 axis, the tilt angle is 0°, that is, the center line 18 of the rotor tip seal 9 is perpendicular to the tangent line 19 to the chamber wall 11 and therefore the seal 9 is perpendicular to the chamber wall 11. FIG. 2A shows this condition when the rotor tip seal 9 is at the minor axis 17 while FIG. 2B shows this condition when the rotor tip seal 9 is at the major axis 16.

The tilt or the rotor tip seal is described as leading if the seal tilts towards the direction or rotation and trailing if the seal tilts away from the direction of rotation.

Figure 3:
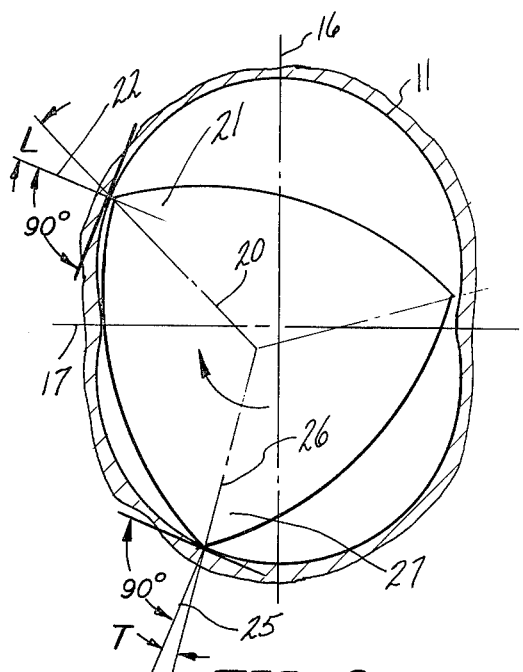
FIG. 3 shows the geometric relationship between the rotor tip and the chamber wall when the rotor tip is at an intermediate position between the minor and major axis.

FIG. 3 shows the tilt angle when the rotor tip is at an intermediate position between the major axis 16 and the minor axis 17. The center line 20 of the rotor tip 21 does not coincide with the perpendicular 22 to the chamber wall 11 at the point of contact. In the situation shown in FIG. 3, there is shown a leading angle L, between the center line 20 and perpendicular axis 22. Also shown in FIG. 3 is the situation of a trailing angle T shown between the center line 26 of the rotor tip 27 and the perpendicular 25 to the chamber wall 11.

Figure 4:
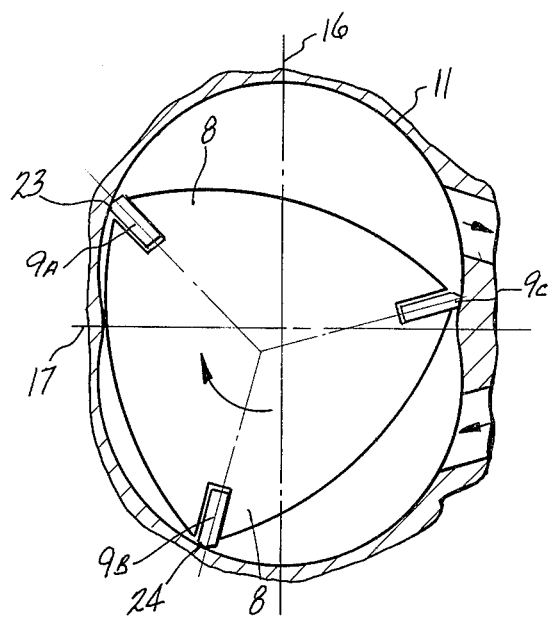
FIG. 4 shows the relationship between the rotor tip seals and the chamber wall.

The behavior of the rotor tip seal relative to the chamber wall 15 shown in FIG. 4 may be described as follows: as the rotor tip seal 9A, 9B and 9C moves from a minor axis 17 to a major axis 16 the seal 9A, 9B and 9C adapts an increasing leading angle until it reaches the midway point between the major 16 and minor axis 17. Then the angle is gradually reduced until the angle reaches 0° at the major axis 16. A similar situation exists as the seal 9A, 9B and 9C moves from the major axis 16 to a minor axis 17 except that the angle is a trailing angle. When the seal 9A is in the position shown, the trailing edge 23 of the seal 9A contacts the chamber wall 11. When the seal 9B is in the position shown, the leading edge 24 of the seal 9B contacts the chamber wall 11.

The instant invention comprises an improved form of rotor tip seal for use in rotary internal combustion engines. The seal is comprised of at least two metals, having different mechanical properties, metallurgically bonded together to form a composite. This composite seal is mounted in the rotor tip in such a way that as the tilt angle changes during operation, different components of the composite seal contact the chamber wall at different times during the combustion process. The seal components are preferably made from materials chosen for their wear characteristics.

In a conventional rotary internal combustion engine different amounts of wear occur on the leading and trailing sealing edges. Typically the leading edges wear twice as fast as the trailing edges. This uneven wear contributes to poor sealing, loss of power and poor fuel economy. By properly selecting the components of the composite seal of the present invention, advantageous material properties may be obtained during different parts of the engine cycle as different parts of the seal come in contact with the cavity wall.

As previously discussed, the operation of the rotary internal combustion engine depends upon the change in volume of working space defined by the rotor face, the two rotor tip seals and the chamber face between the two rotor tip seals. As this working space makes a complete circuit around the chamber wall the four phases or "strokes" (to use conventional internal combustion engine terminology), intake, combustion, power and exhaust take place. It is a characteristic of the internal combustion engine that each of these four phases occurs at a fixed position relative to the epitrochoidal chamber. Because of this localization of the four phases, extreme localized heating occurs at those parts of the chamber wall corresponding to the power and exhaust phases. Another difference caused by the localization of the phases is the reduction of friction on the chamber wall by the presence of unburned fuel during the intake and compression phases.

Because of the differences of chamber wall temperature, chamber wall friction coefficient and gas pressure, it is difficult to construct a sealing system which is effective and has a long operating life. Through the use of the present invention, which comprises a composite metal rotor tip seal, a far more satisfactory sealing system is obtained.

Figure 5:
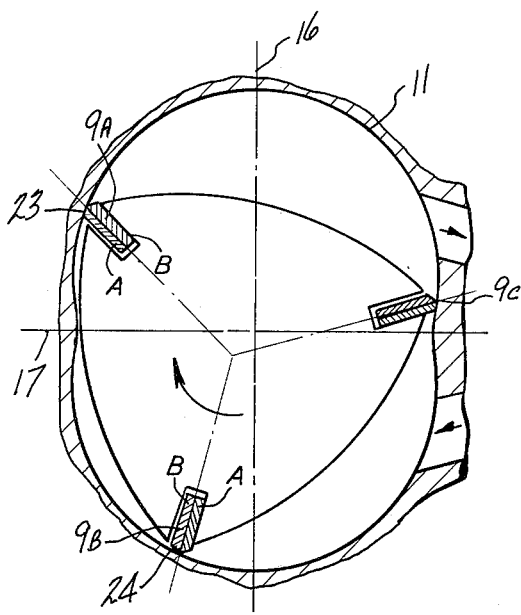
FIG. 5 shows a cross-sectional view of a rotary internal combustion engine having a two layer composite seal according to the present invention.

FIG. 5 illustrates the basic concept of the present invention. Through the fabrication of the rotor tip seals 9A, 9B and 9C from a composite metallic material formed from components A and B, it is possible to obtain an improved sealing system for a rotary internal combustion engine. As shown in FIG. 5 when the rotor tip seal 9A is traveling from a minor axis 17 to a major axis 16, the trailing edge 23 of the rotor tip seal 9A contacts the chamber wall 11. By selecting the material A which forms a trailing edge 23, with reference to its frictional properties relative to the chamber wall 11, taking into account the temperature and presence or absence of lubrication, it is possible to obtain improved sealing. Likewise when the rotor tip seal 9B is in the position shown, the leading edge 24 of the seal 9B contacts the chamber wall 11. Since the leading edge 24, of the seal 9B is made from material B having selected frictional characteristics, improved sealing and wear resistance may be obtained.

The materials from which the composite seal of the present invention is fabricated are selected for their frictional properties and resistance to wear relative to the chamber wall at different temperatures and their resistance to erosion by high temperature gases encountered during operation of the engine. As previously mentioned, conventional seals have been found to wear at least twice as fast on the leading edge as on the trailing edge. This uneven wear rate is detrimental to sealing efficiency. By properly selecting the components of the composite seal of the present invention a more even wear rate may be obtained. It is desirable that the composite seals of the present invention be fabricated from at least two copper alloys metallurgically bonded together.

It will be appreciated that one of the major purposes of the present invention is to provide a composite seal having essentially uniform wear characteristics from the leading edge of the seal to the trailing edge of the seal. This goal will be achieved by properly selecting the materials from which the seal is fabricated. It is difficult, however, to precisely predict the wear characteristics of different alloys from their mechanical properties at room temperature or from different types of conventional wear tests. There is, however, a general correlation between the wear behavior of the seal material within the engine and hardness, yield strength and room temperature abrasion characteristics. As a general rule, the hardness of the leading component should be at least twenty points, on the Diamond Pyramid Hardness scale, greater than the hardness of the trailing component. Likewise, the yield strength of the material from which the leading component is to be fabricated will generally be at least 5 ksi greater than the yield strength of the trailing component material. Finally, the abrasion characteristics of the leading component material should be at least 10% less as measured in weight loss per unit area than the abrasion characteristics of the trailing component when these characteristics are measured at room temperature using a standard type abrasion test.

The most obvious way to obtain these desired differences in hardness, yield strength and abrasion resistance is by using alloys having different chemical compositions. Of course, these different values may also be obtained by using the same alloy in different conditions. For example, if the alloy in question is age hardenable, two components may readily be produced having different properties merely by changing the aging conditions. Another possibility is to add a small amount of grain refiner during the casting of one of the components, thereby producing two components having vastly different grain sizes and therefore having different mechanical properties. Finally, it may be possible to use two components which have had different amounts of cold work and therefore have different mechanical properties.

Figure 6:
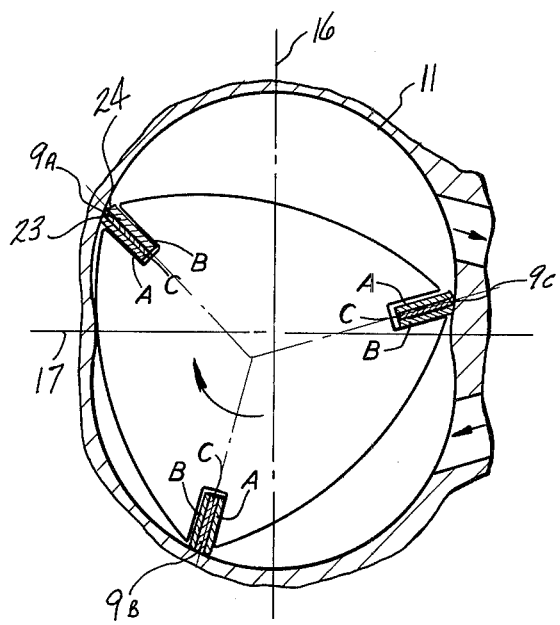
FIG. 6 shows a rotary internal combustion engine having a three layer composite seal according to the present invention.

A desirable embodiment for use in engines in which extremely high temperatures are encountered consists of a three layer composite. This embodiment is shown in FIG. 6. Component C of the composite which forms the rotor tip seals 9A, 9B and 9C is selected for its high temperature mechanical properties. For example, it may be a ferrous alloy such as stainless steel or low carbon steel, or it may be a high strength non ferrous copper alloy such as CDA alloys 638 or 195. The facing alloy layers A and B are selected for their frictional properties. During the operation of the engine central core or component C would contact the chamber wall 11 only when the rotor tip seal approached a minor axis 17 or a major axis 16. At all other times the facing layers A and B would contact the chamber wall 11. The materials from which facing layers A and B are fabricated should be chosen to minimize the wear on the rotor tip seal and the chamber wall and to equalize the wear on leading edge 24 and the trailing edge 23 of the rotor tip seal.

Of course, other embodiments are possible. For example, the rotor tip seal may have more than one part. For example, the problems encountered in sealing the rotor tip near the corners of the rotor tip may be reduced through the use of a seal having more than one part, preferably all parts of the seal of this embodiment are made of composite material.

The composite materials used for the production of the seals of the present invention may be formed in a variety of different ways. An exemplary technique is illustrated in U.S. Pat. Nos. 3,397,045 and 3,381,364 issued to J. Winter and assigned to the assignee of the present invention. The process disclosed in these patents is briefly described in FIGS. 7, 8, 9 and 10.

Figure 7:
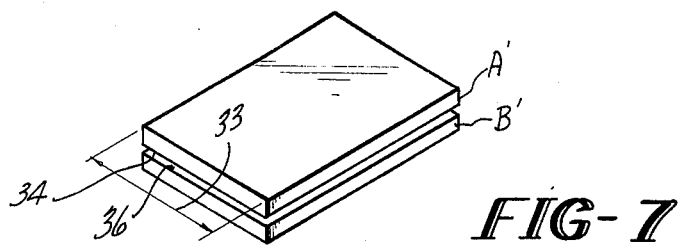
FIG. 7 shows two layers of metal prior to the formation of a composite metal strip.
Figure 8:
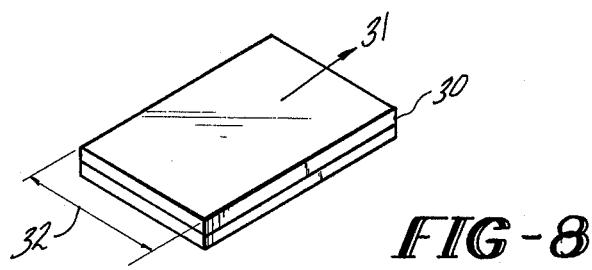
FIG. 8 shows two layers of metal after the formation of a composite strip.
Figure 9:
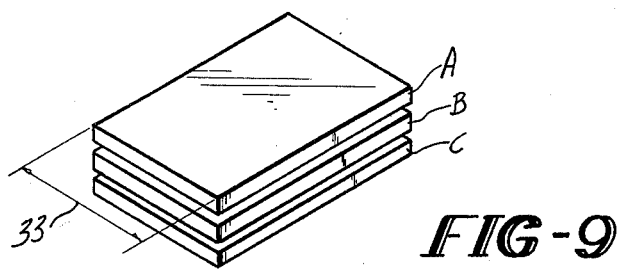
FIG. 9 shows three layers of metal prior to the formation of the composite strip.
Figure 10:
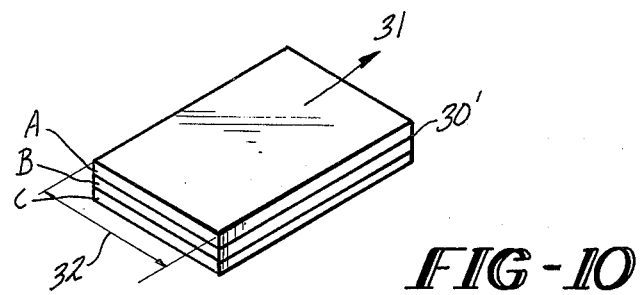
FIG. 10 shows three layers of metal after the formation of a composite metal strip.

Referring to FIGS. 7 and 8 there is illustrated a process for making two layer composite metal seals. Two strips A' and B' of the desired alloys A and B are employed. The major surface 34, 36 of the two strips A' and B' are cleaned so as to remove all dirt, oxide and grease. The two strips of metal A' and B' are superimposed one upon the other with the cleaned major surfaces 34, 36 of the strip in contact with each other as shown in FIG. 7. The two strips A' and B' are then secured together to prevent relative motion as for example by welding the edges together. Thereafter, the superimposed strips A' and B' are pressure welded together by rolling so that the cleaned major surface 34, 36 of the adjacent strips A' and B' become bonded together. The finished composite is shown in FIG. 8. It is a highly desirable feature of the metallurgical bond produced by this process that the bond has a wavy characteristic and consequently has an area at least 20% greater than the area of the metal strip. This increased area increases the strength of the metallurgical bond. The rolling of the strips results in a reduction of the two strips and in elongation of the resultant blank 30 in the direction of rolling 31 while the width 32 of the resultant blank 30 remains substantially the same as the initial width 33 of the strips. Following the rolling operation the blank 30 is usually softened by annealing to make it more ductile and if desired it may be further rolled to a final gage and again softened by annealing. FIGS. 9 and 10 show the analogous process for the production of a three layer composite having layers A, B and C.

The rotor tip seals may be formed by a variety of different mechanical means. For example, a punch and die may be used to stamp out seals of a desired shape. Other methods include slitting the blank 30 or 30' into pieces of the desired width and cutting rectangular seals from the slit pieces of the blank 30 or 30'. A final mechanical operation such as honing may be employed to produce an edge with the desirable surface finish on the blank 30 or 30'. To facilitate the break-in of the engine it may be desirable to coat the edge of the seal which will be in contact with the cavity wall with a layer of lubricant such as molybdenum disulfide or Teflon or a soft metal such as zinc, cadmium or tin.

The concept of the present invention will be made more clear by reference to the following illustrative example:

EXAMPLE

A variety of commercial copper base alloys were tested for their wear properties. The test was performed using a Taber Abraser. In this test a sample is contacted by a rotating abrasive wheel specified by ASTM C 501-66 except that the test was run for 10,000 cycles, the abrasive wheels were dressed every 1,000 cycles, and the samples were weighed to determine relative wear properties. The results are summarized below:

| CDA ALLOY | Weight Loss Mg/10,000 Cycles |
|---|---|
| 194 | 320–390 |
| 195 | 410–450 |
| 510 | 330–350 |
| 619 | 300–315 |
| 638 | 300–340 |
| 688 | 200–230 |

Present commercial rotary internal combustion engines utilizing a homogeneous rotor tip seal, exhibit twice the wear on the leading edge as on the trailing edge. Through a selection of these alloys, for example, CDA Alloy 638 for the leading facing and CDA Alloy 195 for the trailing strip uniform wear would result with attendant better sealing and improved engine performance.

As an alternative, the seals of the present invention may be formed using powder metallurgy techniques. At least two layers of powder having different compositions may be superimposed in a die. The powder layers may then be compressed to form a green compact and then sintered to obtain mechanical properties. If the sintering conditions are properly chosen, a somewhat porous seal may be obtained. Such a porous seal will have the advantage of retaining the lubricating oil thereby improving the lubrication and decreasing the wear of the seal.

As a further alternative, a layer of powder may be compacted together with a strip of metal to attain certain desirable properties. For example, two layers of copper powder may be bonded to a ferrous alloy strip. The resulting seal, after sintering will have a desirable combination of mechanical strength and lubrication properties.

Through the use of powder metallurgy techniques, a significant amount of non-metallic material having desirable mechanical properties such as graphite may be incorporated into the seal.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An improved rotor tip seal for rotary internal combustion engines, of the type having a hollow epitrochoidal chamber defined by a wall and a rotor having a plurality of apexes, the rotor being rotatably and eccentrically mounted within the chamber and having a tip seal located at each apex, comprising: a composite seal of different metal components mounted in the axial direction at each tip of the rotor to seal the space between the rotor tip and the chamber wall, said seal consisting of at least two outer metal strip components, one being the leading seal component and the other being the trailing seal component, the said outer components being adapted cyclically to contact different portions of the said chamber wall, the said component strips being unified by metallurgical bonds at abutting surfaces, and said leading component substantially exceeding said trailing component in wear resistance properties, whereby the said seal components display substantially uniform wear and superior performance during engine operation.

2. A seal as in claim 1 wherein the individual components are metallurgically bonded together with the metallurgical bond having a wavelike configuration and an area at least 20% greater than the area of the layers.

3. A seal as in claim 1 wherein the said leading seal components has a hardness at least twenty points higher on the Diamond Pyramid Hardness scale than the said trailing seal component.

4. A seal as in claim 1 wherein the said leading seal component has a yield strength at least 5 ksi higher than the said trailing seal component.

5. A seal as in claim 1 wherein the said leading seal component is at least 10% more resistant to abrasion than the said trailing seal component.

6. A seal as in claim 1 wherein the outer components are high strength low friction copper alloys.

7. A seal as in claim 1 wherein the seal comprises leading and trailing components each of a copper base alloy.

8. A seal as in claim 2 wherein the seal comprises three components of metal bonded together.

9. A seal as in claim 8 having a central layer or core of an iron alloy and two facing layers of a copper alloy.

10. A seal as in claim 8 having a central layer or core of high strength copper alloy and two facing layers of low friction copper alloys.

* * * * *

UNITED STATES PATENT AND TRADEMARK OFFICE
CERTIFICATE OF CORRECTION

PATENT NO. : 3,947,161
DATED : March 30, 1976
INVENTOR(S) : Charles D. McLain

It is certified that error appears in the above-identified patent and that said Letters Patent are hereby corrected as shown below:

In the Claims:

Column 8, line 28, delete "2" and insert ---7---.

Signed and Sealed this

Third Day of August 1976

[SEAL]

Attest:

RUTH C. MASON
Attesting Officer

C. MARSHALL DANN
Commissioner of Patents and Trademarks